United States Patent
Sotokawa et al.

(10) Patent No.: US 11,644,248 B2
(45) Date of Patent: May 9, 2023

(54) TOTAL HEAT EXCHANGE ELEMENT AND TOTAL HEAT EXCHANGER

(71) Applicant: Mitsubishi Electric Corporation, Tokyo (JP)

(72) Inventors: Hajime Sotokawa, Tokyo (JP); Shinya Tokizaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 139 days.

(21) Appl. No.: 16/971,889

(22) PCT Filed: Mar. 20, 2018

(86) PCT No.: PCT/JP2018/011121
§ 371 (c)(1),
(2) Date: Aug. 21, 2020

(87) PCT Pub. No.: WO2019/180834
PCT Pub. Date: Sep. 26, 2019

(65) Prior Publication Data
US 2021/0088286 A1    Mar. 25, 2021

(51) Int. Cl.
*F28D 9/00* (2006.01)
*B32B 5/02* (2006.01)
(Continued)

(52) U.S. Cl.
CPC ............ *F28D 9/0062* (2013.01); *B32B 5/022* (2013.01); *B32B 7/12* (2013.01); *B32B 29/02* (2013.01);
(Continued)

(58) Field of Classification Search
CPC .......... B32B 3/28; B32B 29/02; B32B 29/06; B32B 29/08; B32B 5/022; B32B 2250/40;
(Continued)

(56) References Cited

FOREIGN PATENT DOCUMENTS

| CN | 2748856 Y | 12/2005 |
| JP | 08198248 A | * 8/1996 |

(Continued)

OTHER PUBLICATIONS

Translation of JP08198248 (abstract and description). (Year: 1996).*
(Continued)

*Primary Examiner* — Catherine A. Simone
(74) *Attorney, Agent, or Firm* — Buchanan Ingersoll & Rooney PC

(57) ABSTRACT

A total heat exchange element includes partitions disposed in a state of being opposed to each other, and a spacer portion keeping a space between the partitions and forming a passage between the partitions. The spacer portion has a laminate structure in which nonwoven fabric base layers including a nonwoven fabric base material are laminated on both sides of a paper layer. A first nonwoven fabric base layer that is the nonwoven fabric base layer of the spacer portion laminated on one side of the paper layer is joined to the partition opposed to the first nonwoven fabric base layer, and a second nonwoven fabric base layer that is the nonwoven fabric base layer of the spacer portion laminated on another side thereof is joined to the partition opposed to the second nonwoven fabric base layer. The element has the above-mentioned configuration and so can improve the humidity exchange efficiency.

7 Claims, 5 Drawing Sheets

(51) Int. Cl.
  *B32B 29/02* (2006.01)
  *B32B 29/06* (2006.01)
  *B32B 29/08* (2006.01)
  *F28F 3/08* (2006.01)
  *B32B 7/12* (2006.01)

(52) U.S. Cl.
  CPC .............. *B32B 29/06* (2013.01); *B32B 29/08* (2013.01); *F28F 3/08* (2013.01); *B32B 2250/03* (2013.01); *B32B 2250/40* (2013.01); *B32B 2262/0292* (2013.01); *B32B 2262/062* (2013.01); *B32B 2307/724* (2013.01)

(58) Field of Classification Search
  CPC ....... B32B 2262/0292; B32B 2262/062; F28D 9/00; F28D 9/0025; F28D 9/0062; F28F 3/08; F28F 3/086; F28F 3/12; F28F 3/14; F28F 21/04; F24F 7/08
  USPC ....... 428/178, 181, 182, 183, 184, 185, 186, 428/188; 165/164, 165, 166, 167
  See application file for complete search history.

(56) References Cited

FOREIGN PATENT DOCUMENTS

| JP | 2015-169401 A | 9/2015 |
|---|---|---|
| JP | 5987854 B2 | 8/2016 |

OTHER PUBLICATIONS

Office Action dated Jun. 29, 2021, in corresponding Chinese Patent Application No. 201880091193.2, and English translation of the Office Action. (13 pages).

International Search Report (PCT/ISA/210) dated Jun. 5, 2018, by the Japan Patent Office as the International Searching Authority for International Application No. PCT/JP2018/011121.

Written Opinion (PCT/ISA/237) dated Jun. 5, 2018, by the Japan Patent Office as the International Searching Authority for International Application No. PCT/JP2018/011121.

* cited by examiner

TOTAL HEAT EXCHANGE ELEMENT AND TOTAL HEAT EXCHANGER

FIELD

The present invention relates to a total heat exchange element and a total heat exchanger which perform total heat exchange between a supply air flow and an exhaust air flow.

BACKGROUND

As a ventilation method implemented while minimizing the loss of heating and cooling efficiency of indoor air conditioning, there is a ventilation method in which heat exchange is performed between a supply air flow and an exhaust air flow. In order to improve the efficiency of heat exchange, total heat exchange is effective in which heat exchange and humidity exchange are performed simultaneously between the supply air flow and the exhaust air flow, that is, sensible heat exchange and latent heat exchange are performed simultaneously therebetween.

In a total heat exchange element that performs total heat exchange, a supply air passage and an exhaust air passage are formed as independent passages with a partition interposed therebetween. For each of the supply air passage and the exhaust air passage, there has been used a construction having a corrugated spacer plate formed by a corrugating fabrication. When a room is ventilated with a total heat exchanger including a total heat exchange element, total heat exchange is performed between the supply air flow flowing through the supply air passage and the exhaust air flow flowing through the exhaust air passage, so that the loss of heating and cooling efficiency of indoor air conditioning can be minimized.

With widespread use of such a total heat exchanger, for example, there has been growing demand to increase the amount of humidification in a building during the winter season, and so it has led to a demand that the total heat exchanger should not only recover sensible heat but also increase the amount of recovery of moisture in humidified air in the exhaust air flow. In other words, the total heat exchanger is required to improve not only the temperature exchange efficiency but also the humidity exchange efficiency.

Besides, in cooling conditions during the summer season, ventilation by the total heat exchanger has come to be considered in order to reduce the energy of latent heat processing by an air conditioner, that is, the energy of dehumidification thereby. That is, it has come to be considered that, by installing the total heat exchanger, the humidity exchange is performed for ventilation between the supply air flow flowing through the supply air passage and the exhaust air flow flowing through the exhaust air passage in the total heat exchange element, without allowing high humidity air outside the room to enter the room as it is. In such a use environment of the total heat exchanger, the total heat exchange element is required to have a high humidity exchange efficiency.

As a total heat exchange element capable of improving the humidity exchange efficiency, Patent Literature 1 discloses a total heat exchange element that includes a partition member to which a hygroscopic salt is added, and a spacing member in which a resin layer and a hydrophobic nonwoven fabric material are stacked on top of another, wherein the humidity exchange efficiency is improved by adding the hygroscopic salt to the spacing member as with the partition member to utilize a connection surface between the partition member and the spacing member as a moisture-permeable surface.

CITATION LIST

Patent Literature

Patent Literature 1: Japanese Patent No. 5987854

SUMMARY

Technical Problem

However, the total heat exchange element of Patent Literature 1 mentioned above needs to increase the additive amount of a hygroscopic agent in order to improve the humidity exchange efficiency. In this case, however, the hygroscopic agent is washed away or reduced over time due to dew condensation water generated by self-deliquescence of the hygroscopic agent when the high humidity air continues to flow, so that the improvement of the humidity exchange efficiency is limited.

The present invention has been made in view of the above circumstances, and an object of the present invention is to provide a total heat exchange element capable of improving humidity exchange efficiency.

Solution to Problem

In order to solve the above-mentioned problem and achieve the object, the present invention provides a total heat exchange element comprising: a plurality of partitions disposed in a state of being opposed to each other; and a spacer portion to keep a space between the partitions and form a passage between the partitions, wherein the spacer portion has a laminate structure in which nonwoven fabric base layers using a nonwoven fabric as a base material are layered on both sides of a paper layer, a first nonwoven fabric base layer that is the nonwoven fabric base layer of the spacer portion layered on one side of the paper layer is joined to the partition opposed to the first nonwoven fabric base layer, and a second nonwoven fabric base layer that is the nonwoven fabric base layer of the spacer portion layered on another side of the paper layer is joined to the partition opposed to the second nonwoven fabric base layer.

Advantageous Effects of Invention

The total heat exchange element according to the present invention has an effect of being able to provide a total heat exchange element that can improve the humidity exchange efficiency.

DESCRIPTION OF EMBODIMENTS

A total heat exchange element and a total heat exchanger according to embodiments of the present invention will now be described in detail with reference to the drawings. Note that the present invention is not necessarily limited by the embodiments.

First Embodiment

Figure 1:
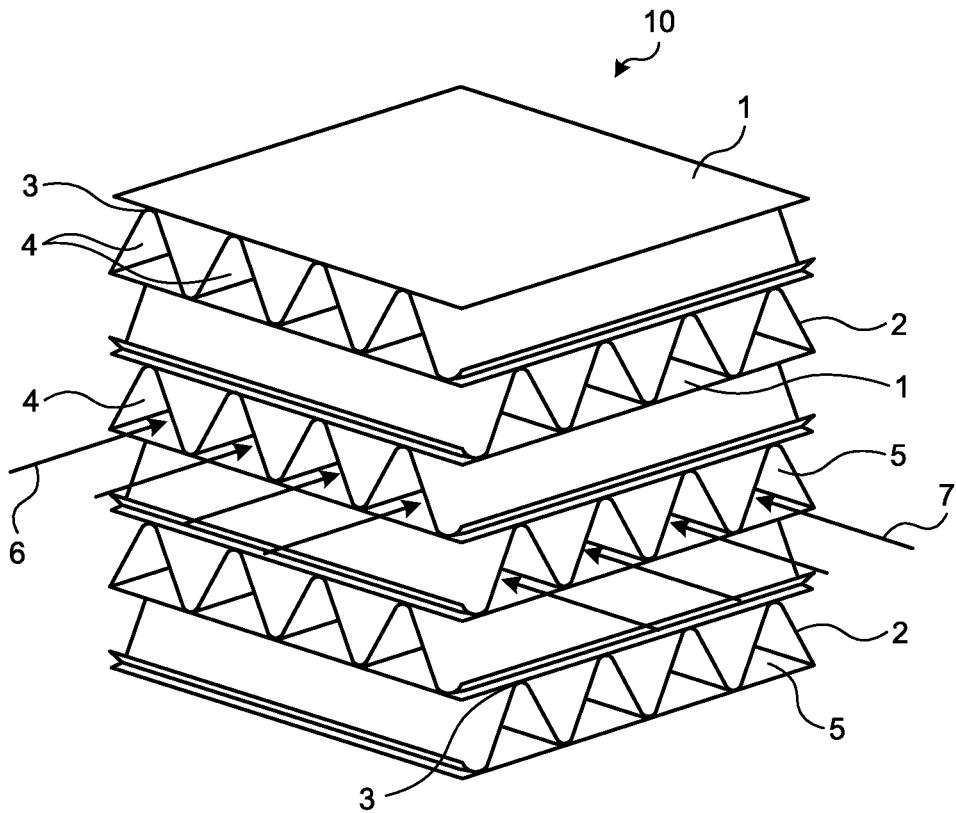
FIG. 1 is an external perspective view illustrating a schematic configuration of a total heat exchange element according to a first embodiment of the present invention.
Figure 2:
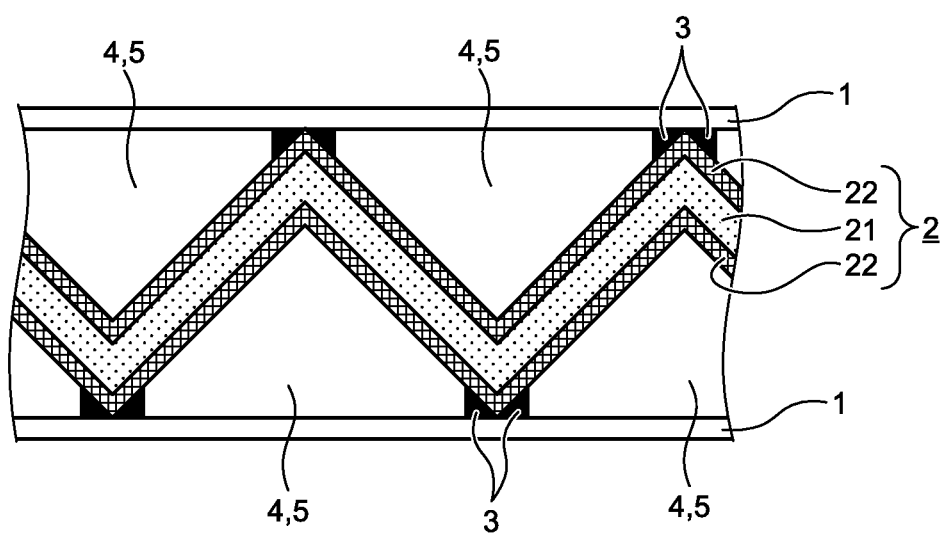
FIG. 2 is a vertical sectional view illustrating a spacer portion and partitions disposed sandwiching the spacer portion, which are extracted from the total heat exchange element according to the first embodiment.

FIG. 1 is an external perspective view illustrating a schematic configuration of a total heat exchange element 10 according to a first embodiment of the present invention. FIG. 2 is a vertical sectional view illustrating a spacer portion 2 and partitions 1 disposed sandwiching the spacer portion 2, which are extracted from the total heat exchange element 10 according to the first embodiment. The total heat exchange element 10 includes first air passages 4 as first passages each provided in the form of a layer, second air passages 5 as second passages each provided in the form of a layer, and the partitions 1 each having a plate shape and serving as a partition between the first air passage 4 and the second air passage 5. The total heat exchange element 10 further includes the spacer portions 2 each having a corrugated shape and forming the first air passage 4 or the second air passage 5 to keep the space between the partitions 1, and joint 3 joining the partition 1 and the spacer portion 2. The corrugated shape is a wave shape formed of peaks and troughs.

The total heat exchange element 10 has a structure in which the partitions 1 each having a plate shape and the spacer portions 2 each having a corrugated shape are stacked alternately on top of another. The spacer portions 2 have the corrugated shape to be able to reliably form the first air passages 4 and the second air passages 5 and keep a space between the partitions 1. When the partitions 1 and the spacer portions 2 are stacked on top of another, longitudinal directions of the peaks of the spacer portions 2 that are adjacent to each other in a stacking direction of the partitions 1 and the spacer portions 2 are crossed to each other, whereby the first air passage 4 and the second air passage 5 are adjacent to each other with the partition 1 interposed therebetween, an extending direction of the first air passages 4 and an extending direction of the second air passages 5 cross each other in a plan view, and the first air passage 4 and the second air passage 5 are independent of each other.

In the total heat exchange element 10, between first air flows 6 flowing through the first air passages 4 and second air flows 7 flowing through the second air passages 5 exchange latent heat and sensible heat are exchanged using the partitions 1 as media. In the first embodiment, the spacer portion 2 is formed in the corrugated shape, but the spacer portion 2 may be in any form as long as a predetermined space can be kept between the partitions 1. The spacer portion 2 may be, for example, a sheet bent in a rectangular wave shape, a sheet bent in a triangular wave shape, or a plurality of plate pieces.

Hereinafter, each component of the total heat exchange element 10 according to the first embodiment will be described. The partition 1 consists of a single layer of a paper layer that is a layer of paper made of paper material. The partition 1 is preferably made of specially treated paper that is made as thin as possible in order to improve moisture permeability, and preferably has a thickness in a range of 5 μm or more and 100 μm or less, preferably 8 μm or more and 80 μm or less, more preferably 10 μm or more and 50 μm or less.

The partition 1 is preferably made of specially treated paper that is made by special processing of adding a hygroscopic agent in order to improve the moisture permeability or other special processing. The hygroscopic agent to be contained in the partition 1 in order to improve the moisture permeability is preferably a deliquescent salt particularly in order to improve the moisture permeability of the partition 1. As the deliquescent salt, at least one of lithium chloride and calcium chloride is used. The amount of lithium chloride or calcium chloride added to the partition 1 is in a range of 2 $g/m^2$ or more and 10 $g/m^2$ or less, preferably 3 $g/m^2$ or more and 6 $g/m^2$ or less. Note that when both lithium chloride and calcium chloride are used as the hygroscopic agent, the amount of lithium chloride and calcium chloride added to the partition 1 is in a range of 2 $g/m^2$ or more and 10 $g/m^2$ or less in total.

In terms of ensuring a humidity exchange performance having a level suitable for practical use as the total heat exchange element 10, the moisture permeability of the partition 1 according to the first embodiment corresponds to a water-vapor transmission rate of 10 $kg/m^2$/day or higher, preferably 15 $kg/m^2$/day or higher in measurement of a water-vapor transmission rate by the infrared sensor method (Mocon method) at a relative humidity of 100% and a temperature of 30° C.

The partition 1 needs to have a gas barrier property for ventilation in the total heat exchange element 10. The gas barrier property of the partition 1 according to the first embodiment corresponds to 500 seconds/100 cc or more, preferably 1000 seconds/100 cc or more in measurement of air permeance by the Gurley method. With the partition 1 having the gas barrier property in the range of 500 seconds/100 cc or more, separation of the supply air and the exhaust air in the total heat exchange element 10, that is, separation of the first air flows 6 flowing through the first air passages 4 and the second air flows 7 flowing through the second air passages 5, is achieved more reliably.

Note that in the partition 1, the heat exchange efficiency in exchanging heat between the supply air and the exhaust air, that is, between the first air flows 6 flowing through the first air passages 4 and the second air flows 7 flowing through the second air passages 5, is mainly dependent on a resistance of heat transfer in a boundary layer of air, and so hardly depends on s heat transfer property of the material of the partition 1. For this reason, the heat transfer property of the partition 1 hardly affects the heat exchange efficiency of the total heat exchange element 10. That is, assuming that the thermal resistance of the partition 1 is equal to 1, the thermal resistances of air layers on the front and back of the partition 1 are each equal to about 10, and a total thereof is equal to 21. When the partition 1 is made of metal, with a thermal conductivity of metal being 2000 to 3000 times that of paper, the thermal resistance of the partition 1 becomes $\frac{1}{2000}$ to $\frac{1}{3000}$. However, when the thermal resistances of the air layers on the front and back of the partition 1 are included in the thermal resistance of the partition 1, the latter is equal to 20.0005, for example, which is only a 5% change at most. For this reason, the heat transfer property of the partition 1 hardly affects the heat exchange efficiency of the total heat exchange element 10. Note that although the first embodiment illustrates the case where the partition 1 has a single-layer structure of the paper layer, the partition 1 is not limited to the single-layer structure of the paper layer as long as the effect of the total heat exchange element 10 according to the first embodiment is exerted. The partition 1 may have a multilayer structure of paper layers.

The spacer portions 2 define the shape of each of the first air passages 4 and the second air passages 5 in the total heat exchange element 10. The spacer portion 2 according to the first embodiment has a multilayer structure of a paper layer 21 of the spacer portion made of paper material, and nonwoven fabric base layers 22 of the spacer portion using a nonwoven fabric as a base material. That is, the spacer portion 2 has a laminate structure in which the nonwoven fabric base layer 22 of the spacer portion, the paper layer 21 of the spacer portion, and the nonwoven fabric base layer 22 of the spacer portion are laminated in this order so that the nonwoven fabric base layers 22 of the spacer portion are stacked on both surfaces of the paper layer 21 of the spacer portion. Therefore, the spacer portion 2 has the structure in which the nonwoven fabric base layers 22 of the spacer portion are exposed on both front and back sides. Through the nonwoven fabric base layers 22 of the spacer portion exposed on the surfaces of the spacer portion 2, the total heat exchange element 10 according to the first embodiment can facilitate humidity exchange between the first air flows 6 flowing through the first air passages 4 and the second air flows 7 flowing through the second air passages 5 as described later, and can ensure the adhesive strength between the spacer portion 2 and the partition 1. Also, the paper layer of the spacer portion 21 contains a hygroscopic agent. Note that the paper layer of the spacer portion 21 may be formed of at least one paper layer that does not contain a hygroscopic agent.

The spacer portion 2 is joined to the partitions 1 by the joints 3 at the peaks and troughs of its corrugated shape. In other words, in the spacer portion 2, the nonwoven fabric base layers 22 of the spacer portion exposed on the surfaces are joined to the partitions 1 by the joints 3. The spacer portion 2 thus forms the first air passages 4 or the second air passages 5 between itself and the partitions 1, and also keeps a space between the partitions 1 disposed facing each other.

The paper layer 21 of the spacer portion is preferably made of specially treated paper that is made by special processing of adding a hygroscopic agent, and by other special processing in order to improve the moisture permeability of the joints 3 joining the partitions 1 and the spacer portion 2. The material of the hygroscopic agent is not particularly limited, but a deliquescent salt is preferably used therefor. As the deliquescent salt, at least one of lithium chloride and calcium chloride is used. The amount of lithium chloride or calcium chloride added to the paper layer 21 of the spacer portion is in a range of 2 $g/m^2$ or more and 10 $g/m^2$ or less, preferably a range of 3 $g/m^2$ or more and 6 $g/m^2$ or less. Note that when both lithium chloride and calcium chloride are used as the hygroscopic agent, the amount of lithium chloride and calcium chloride added to the paper layer 21 of the spacer portion 2 is in a range of 2 $g/m^2$ or more and 10 $g/m^2$ or less in total.

A flame retardant may be added to the paper layer 21 of the spacer portion in order to ensure the flame retardancy of the total heat exchange element 10. The flame retardancy of the spacer portion 2 is preferably at the level of a second grade or higher of disaster prevention, more preferably a first grade or higher of disaster prevention in the Meter burner method. In the first embodiment, as the material of the flame retardant added to the paper layer 22 of the spacer portion, a bromine-based flame retardant, a phosphorus-based flame retardant, an inorganic flame retardant such as a metal hydroxide or a metallic oxide, or a silicone-based flame retardant is used.

The paper layer 21 of the spacer portion has the thickness smaller than the total thickness of the spacer portion 2, and has the basis weight lighter than the total basis weight of the spacer portion 2. The thickness of the paper layer 21 of the spacer portion is 10 µm or more and 100 µm or less, preferably 15 µm or more and 90 µm or less, more preferably 20 µm or more and 80 µm or less. The air impermeability of the spacer portion 2 is substantially achieved by the paper layer 21. Thus, the air impermeability of the paper layer 21 of the spacer portion is 1 second/100 ml or more, preferably 3 seconds/100 ml or more.

The nonwoven fabric base layer 22 of the spacer portion is a fabric made by entangling fibers without weaving fibers and, in terms of the strength and cost of the fabric, the fiber material is preferably cellulose fibers, polyurethane fibers, polyester fibers, or polypropylene fibers, and any mixture of them. The cellulose fibers and polyurethane fibers are more preferable because they are hydrophilic materials and are expected to improve the diffusion of water molecules using capillaries inside the fibers.

Generally, with regard to sensible heat exchange in a total heat exchange element having a partition and a spacer portion, the partition functions as a heat transfer surface, and additionally the spacer portion serves as a heat transfer fin. That is, the spacer portion works as an extended heat transfer area used to increase the heat transfer area. The heat transfer characteristic of the extended heat transfer area is determined by the shape of the heat transfer fin, thermal conductivity, and a heat transfer coefficient in an air path. When "a" represents an area coefficient that is an area ratio of the extended heat transfer area to the area of the partition, and "S" represents a partition area that is the area of the partition, a total heat transfer area $S_{total}$ including the extended heat transfer area based on the fin effect of the heat transfer fin can be expressed as $S_{total}=(1+\alpha)\times S$. The area coefficient "a" is determined by the shape and the physical properties of the spacer portion serving as the heat transfer fin as described above, and the heat transfer coefficient around the heat transfer fin. Typically, it has been known that the area coefficient in a commonly-used total heat exchange element takes a value of $\alpha$=0.1 or more and 0.3 or less.

Similarly, in the case of movement of humidity in a total heat exchange element having a partition and a spacer portion, the spacer portion can be treated as a humidity transfer fin that transfers humidity. That is, the spacer portion serves as a humidity transfer fin for causing movement of humidity, that is, a humidity transfer fin for transferring latent heat, and works as an extended moisture permeable area used to increase a moisture permeable area. The humidity transfer rate of the extended moisture permeable area is determined by the shape and humidity transfer rate of the humidity transfer fin, and the humidity transfer rate in an air path. It is assumed that "β" represents an area coefficient that is an area ratio of the extended moisture permeable area to the area of the partition, "S" represents a partition area that is the area of the partition, and a total moisture permeable area $S_x$ including the extended moisture permeable area based on the fin effect of the humidity transfer fin can be expressed as $S_x=(1+\beta)\times S$. In this case, in ordinary paper or specially treated paper, the area coefficient β takes a value significantly smaller than 1 because the value of a diffusion coefficient D of water in the spacer portion corresponding to the thermal conductivity of the temperature fin is as small as $10^{-8}$ or less, whereby the effect of the extended moisture permeable area is almost zero. In other words, in the heat exchange phenomenon between the supply air flow and the exhaust air flow, the spacer portion is effective as the heat transfer fin, but little as the humidity transfer fin because the movement of water in the fin is slower than the movement of heat.

However, in the case of the spacer portion 2 according to the first embodiment in which the nonwoven fabric base layers 22 of the spacer portion are disposed on both the front and back surfaces of the paper layer 21 of the spacer portion, capillary action in the nonwoven fabric base layers 22 of the spacer portion is used to be able to increase the speed of movement of water significantly as compared with a case where water moves on the surface of and inside the ordinary paper or specially treated paper, or a hydrophobic resin layer. When a comparison is performed using the diffusion coefficient D of water corresponding to the speed of movement of water, the spacer portion 2 according to the first embodiment can improve the diffusion coefficient D [$m^2/s$] with double- to triple-digit increase, that is, with a level of 10 to 100 times, as compared to the ordinary or specially treated paper or the resin layer, thus making it possible to set the coefficient D to $10^{-6}$ or more and $10^{-7}$ or less. As a result, the spacer portion 2 according to the first embodiment can have the area coefficient β equal to 0.01 or more and 0.1 or less, and can be used as an extended moisture permeable surface.

Figure 3:
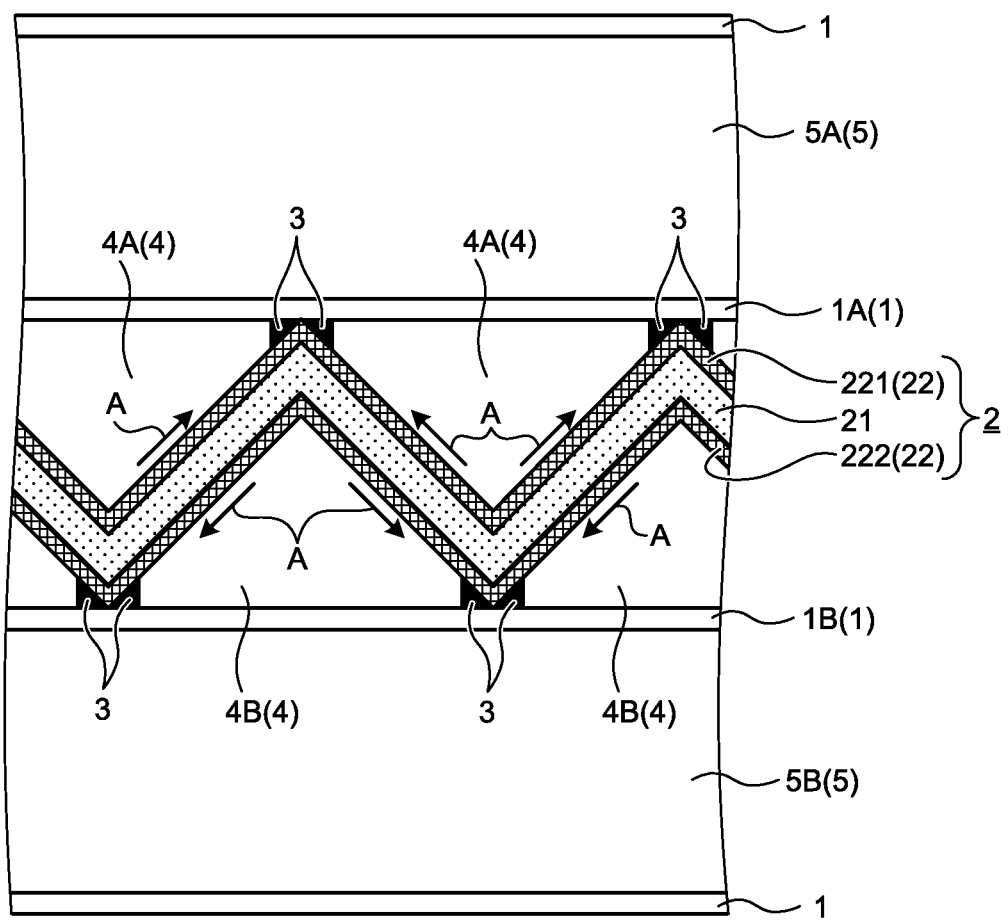
FIG. 3 is a schematic view for explaining movement of humidity in the total heat exchange element according to the first embodiment.

FIG. 3 is a schematic view illustrating the movement of humidity in the total heat exchange element 10 according to the first embodiment. FIG. 3 illustrates a case where the humidity moves from the first air passages 4 to the second air passages 5. The total heat exchange element 10 according to the first embodiment includes the spacer portion 2 in which the nonwoven fabric base layer 22 of the spacer portion, the paper layer 21 of the spacer portion, and the nonwoven fabric base layer 22 of the spacer portion are stacked on top of another in this order and the nonwoven fabric base layers 22 of the spacer portion are exposed on both the front and back sides of the spacer portion. With this, in the spacer portion 2, the nonwoven fabric base layers 22 of the spacer portion are joined to the partitions 1 to which the nonwoven fabric base layers 22 are opposed, by means of the joints 3. More specifically, as illustrated in FIG. 3, a first nonwoven fabric base layer 221 that is the nonwoven fabric base layer 22 of the spacer portion laminated on one surface of the paper layer 21 of the spacer portion is joined to a first partition 1A that is the partition 1 opposed to the first nonwoven fabric base layer 221. Moreover, a second nonwoven fabric base layer 222 that is the nonwoven fabric base layer 22 of the spacer portion laminated on another surface of the paper layer 21 of the spacer portion is joined to a second partition 1B that is the partition 1 opposed to the second nonwoven fabric base layer 222.

Therefore, most of the moisture adsorbed on the nonwoven fabric base layers 22 of the spacer portion that are present on the surfaces of the spacer portion 2 passes through minute gaps in the nonwoven fabric base layers 22 of the spacer portion, thereby moving to the joints 3 by capillary action. More specifically, most of the moisture adsorbed on the nonwoven fabric base layers 22 of the spacer portion passes through the inside and the surfaces of the nonwoven fabric base layers 22 of the spacer portion along the directions of arrows A illustrated in FIG. 3, thereby moving to the joints 3. Some of the moisture adsorbed on the nonwoven fabric base layers 22 of the spacer portion that are present on the surfaces of the spacer portion 2 moves to the joints 3 through the paper layer 21 of the spacer portion. Then, the moisture that has reached the joints 3 moves to the second air passages 5 through the joints 3 and the partitions 1.

At this time, the speed of movement of the moisture in the nonwoven fabric base layers 22 of the spacer portion is higher than the speed of movement of the moisture in the paper layer 21 of the spacer portion. For this reason, the total heat exchange element 10 allows the moisture adsorbed on the spacer portion 2 to move to the joints 3 quickly as compared to the case where the spacer portion 2 consists of ordinary or specially treated paper or a hydrophobic resin layer, or a laminate thereof. Accordingly, the total heat exchange element 10 can quickly carry the moisture adsorbed on the spacer portion 2 to the partitions 1, and can achieve high humidity exchange performance as compared to the case where the spacer portion 2 consists of ordinary or specially treated paper or a hydrophobic resin layer, or a laminate thereof. Therefore, the movement of humidity can be performed efficiently from the air flowing through the first air passages 4 to the air flowing through the second air passages 5.

Moreover, the total heat exchange element 10 has the spacer portion 2 including the nonwoven fabric base layers 22 of the spacer portion that are formed on both the front and back surfaces of the paper layer 21 of the spacer portion, the layer 21 being intended to be used as the spacer portion, the nonwoven fabric base layer 22 being configured to facilitate the movement of moisture in the plane of the spacer portion 2 by capillary action. This allows for efficient movement of humidity from the air flowing through the first air passages 4 to the air flowing through the second air passages 5 located on both sides in the stacking direction in which the partitions 1 and the spacer portion 2 are stacked.

That is, in the example illustrated in FIG. 3, the total heat exchange element 10 can efficiently move the humidity from first air passages 4A that are the first air passages 4 defined by the first partition 1A as the partition 1 and the spacer portion 2, to second air passages 5A that is the second air passages 5 adjacent to the first partition 1A. Also, the total heat exchange element 10 can efficiently move the humidity from first air passages 4B that are the first air passages 4 defined by the second partition 1B as the partition 1 and the spacer portion 2, to second air passages 5B that are the second air passages 5 adjacent to the second partition 1B.

Note that the movement of the humidity from the air flowing through the first air passages 4 to the air flowing through the second air passages 5 is described as an example here, but an effect similar to that described above can also be obtained in the case where the humidity is moved from the air flowing through the second air passages 5 to the air flowing through the first air passages 4.

Figure 4:
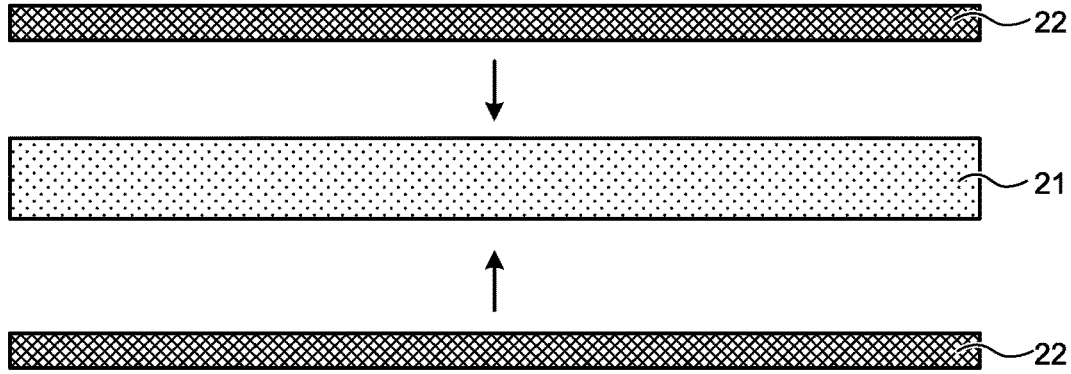
FIG. 4 is a sectional view illustrating a first method of forming a spacer portion according to the first embodiment.
Figure 5:
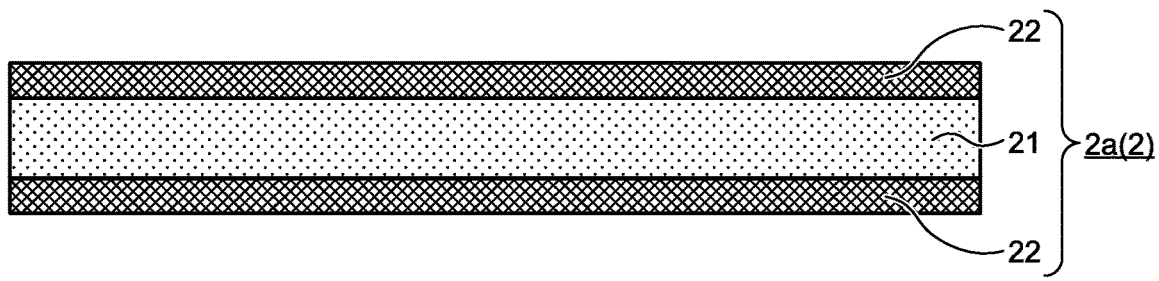
FIG. 5 is a sectional view illustrating a spacer portion formed by the first method of forming a spacer portion according to the first embodiment.
Figure 6:
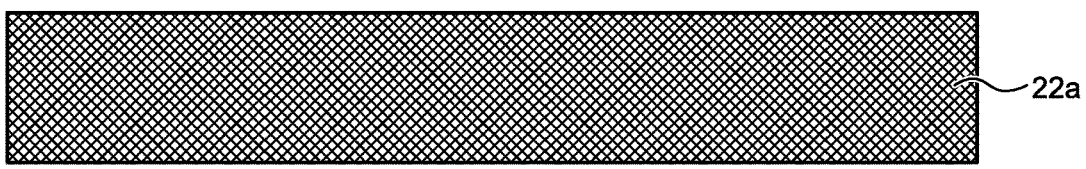
FIG. 6 is a sectional view illustrating a second method of forming a spacer portion according to the first embodiment.
Figure 7:
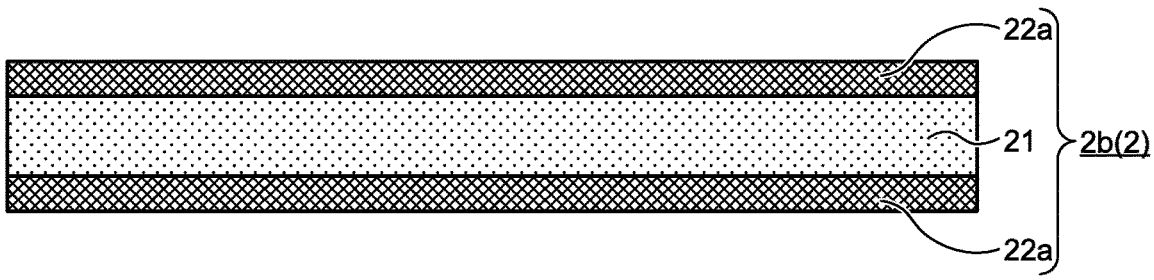
FIG. 7 is a sectional view illustrating a spacer portion formed by the second method of forming a spacer portion according to the first embodiment.
Figure 8:
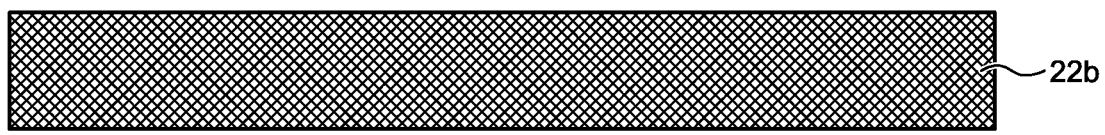
FIG. 8 is a sectional view illustrating a third method of forming a spacer portion according to the first embodiment.
Figure 9:
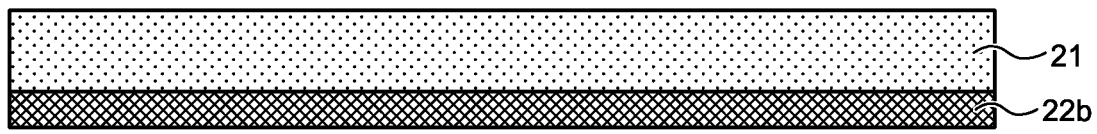
FIG. 9 is a sectional view illustrating the third method of forming a spacer portion according to the first embodiment.
Figure 10:
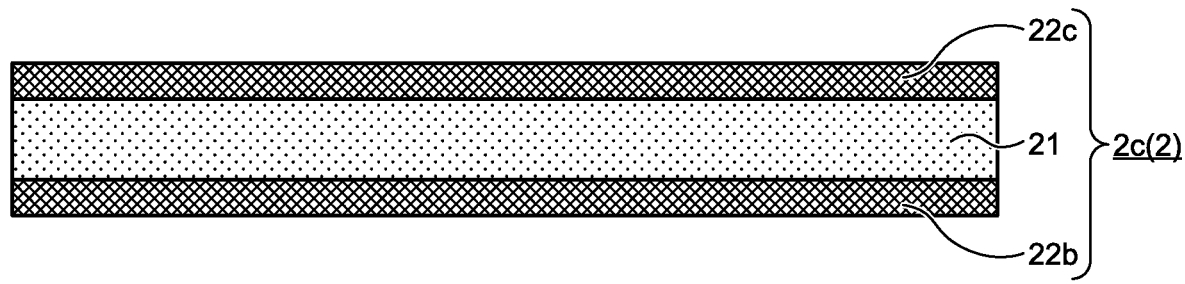
FIG. 10 is a sectional view illustrating a spacer portion formed by the third method of forming a spacer portion according to the first embodiment.

Next, a description will be given of a method of forming the spacer portion 2 that can improve a humidity transfer fin effect by capillary action. FIG. 4 is a sectional view illustrating a first method of forming the spacer portion 2 according to the first embodiment. FIG. 5 is a sectional view illustrating the spacer portion 2 formed by the first method of forming the spacer portion 2 according to the first embodiment. FIG. 6 is a sectional view illustrating a second method of forming the spacer portion 2 according to the first embodiment. FIG. 7 is a sectional view illustrating the spacer portion 2 formed by the second method of forming the spacer portion 2 according to the first embodiment. FIG. 8 is a sectional view illustrating a third method of forming the spacer portion 2 according to the first embodiment. FIG. 9 is a sectional view illustrating the third method of forming the spacer portion 2 according to the first embodiment. FIG. 10 is a sectional view illustrating the spacer portion 2 formed by the third method of forming the spacer portion 2 according to the first embodiment.

In the first method of forming the spacer portion 2, as illustrated in FIG. 4, the nonwoven fabric base layers 21 of the spacer portion are attached to both sides of the paper layer 21 of the spacer portion. As a result, as illustrated in FIG. 5, a spacer portion 2a is formed as the spacer portion 2 in which the nonwoven fabric base layer 22 of the spacer portion, the paper layer 21 of the spacer portion, and the nonwoven fabric base layer 22 of the spacer portion are stacked in this order.

In the second method of forming the spacer portion 2, specially treated paper to be the paper layer 21 of the spacer portion is made in the central region in the thickness direction of a nonwoven fabric base layer 22a of the spacer portion, which is thicker than the nonwoven fabric base layer 22 of the spacer portion, formed as illustrated in FIG. 6. As a result, as illustrated in FIG. 7, a spacer portion 2b is formed as the spacer portion 2 in which the nonwoven fabric base layer 22a of the spacer portion, the paper layer 21 of the spacer portion, and the nonwoven fabric base layer 22a of the spacer portion are stacked in this order.

In the third method of forming the spacer portion 2, as illustrated in FIG. 9, the paper layer 21 of the spacer portion is made on one surface of a nonwoven fabric base layer 22b of the spacer portion as illustrated in FIG. 8 that is thicker than the nonwoven fabric base layer 22 of the spacer portion. Next, a nonwoven fabric base layer 22c of the spacer portion is attached to another surface of the paper layer 21 of the spacer portion 21 on an opposite side to a side on which the nonwoven fabric base layer 22b of the spacer portion is located. As a result, as illustrated in FIG. 10, a spacer portion 2c is formed as the spacer portion 2 in which the nonwoven fabric base layer 22b of the spacer portion, the paper layer 21 of the spacer portion, and the nonwoven fabric base layer 22c of the spacer portion are stacked in this order.

In the case of the spacer portion 2a illustrated in FIG. 5, the basis weight of the nonwoven fabric base layer 22 of the spacer portion is 10 g/m$^2$ or more and 200 g/m$^2$ or less, preferably 15 g/m$^2$ or more and 150 g/m$^2$ or less in terms of ensuring necessary strength suitable for practical use as the spacer portion 2 and allowing heat exchange to be performed more smoothly for temperature and humidity. Moreover, the thickness of the nonwoven fabric of the nonwoven fabric base layer 22 of the spacer portion is 5 μm or more and 500 μm or less, preferably 15 μm or more and 400 μm or less, more preferably 40 μm or more and 300 μm or less in terms of ensuring necessary strength suitable for practical use as the spacer portion 2 and allowing heat exchange to be performed more smoothly for temperature and humidity.

In the case of the spacer portion 2b illustrated in FIG. 7, the basis weight of the nonwoven fabric base layer 22a of the spacer portion is 10 g/m$^2$ or more and 300 g/m$^2$ or less, preferably 15 g/m$^2$ or more and 200 g/m$^2$ or less in terms of ensuring necessary strength suitable for practical use as the spacer portion 2 and allowing heat exchange to be performed more smoothly for temperature and humidity. Moreover, the thickness of the nonwoven fabric of the nonwoven fabric base layer 22a of the spacer portion is 10 μm or more and 500 μm or less, preferably 30 μm or more and 400 μm or less, more preferably 80 μm or more and 300 μm or less in terms of ensuring necessary strength suitable for practical use as the spacer portion 2 and allowing heat exchange to be performed more smoothly for temperature and humidity.

In the case of the spacer portion 2c illustrated in FIG. 10, the basis weight of the nonwoven fabric base layer 22b of the spacer portion is 10 g/m$^2$ or more and 250 g/m$^2$ or less, preferably 15 g/m$^2$ or more and 180 g/m$^2$ or less in terms of ensuring necessary strength suitable for practical use as the spacer portion 2 and allowing heat exchange to be performed more smoothly for temperature and humidity. Moreover, the thickness of the nonwoven fabric of the nonwoven fabric base layer 22b of the spacer portion is 8 μm or more and 500 μm or less, preferably 20 μm or more and 400 μm or less, more preferably 60 μm or more and 300 μm or less in terms of ensuring necessary strength suitable for practical use as the spacer portion 2 and allowing heat exchange to be performed more smoothly for temperature and humidity.

Also, the basis weight of the nonwoven fabric base layer 22c of the spacer portion is 10 g/m$^2$ or more and 200 g/m$^2$ or less, preferably 15 g/m$^2$ or more and 150 g/m$^2$ or less in terms of ensuring necessary strength suitable for practical use as the spacer portion 2 and allowing heat exchange to be performed more smoothly for temperature and humidity. Moreover, the thickness of the nonwoven fabric of the nonwoven fabric base layer 22c of the spacer portion is 5 μm or more and 500 μm or less, preferably 15 μm or more and 400 μm or less, more preferably 40 μm or more and 300 μm or less in terms of ensuring necessary strength suitable for practical use as the spacer portion 2 and sufficiently ensuring the speed of movement of humidity in particular.

Note that the basis weights and thicknesses of the spacer portions 2a, 2b, and 2c described above are the numerical values taking into account the fact that the nonwoven fabrics are handled differently when each structure is made. However, the basis weights and thicknesses of the spacer portions 2a, 2b, and 2c are not necessarily limited to the ranges described above.

The gas barrier property of the spacer portion 2 according to the first embodiment is 1 second/100 cc or more, preferably 3 seconds/100 cc or more, in the measurement of air permeance by the Gurley method. With the spacer portion 2 having the gas barrier property in the range described above, the separation of the supply air and the exhaust air in the total heat exchange element 10, that is, the separation between the first air flows 6 flowing through the first air passages 4 and the second air flows 7 flowing through the second air passages 5, is achieved reliably, sufficient ventilation is ensured, and moisture permeability of the partitions 1 and the joints 3 is ensured.

Moreover, the moisture permeability of the spacer portion 2 according to the first embodiment corresponds to a water-vapor transmission rate of 6 kg/m$^2$/day or higher, preferably 10 kg/m²/day or higher, in the measurement of the water-vapor transmission rate by the infrared sensor method (Mocon method) at a relative humidity of 100% and a temperature of 30° C. With the spacer portion 2 having the moisture permeability corresponding to the water-vapor transmission rate in the range of 6 kg/m²/day or higher, the moisture permeability of the joints 3 between the partitions 1 and the spacer portion 2 is ensured, and the humidity exchange performance between the supply air and the exhaust air is maintained at a high level required for practical use as the total heat exchange element 10.

Note that, in the total heat exchange element 10 according to the first embodiment, the spacer portion 2 has a three-layer structure including one single layer of the nonwoven fabric base layer 22 of the spacer portion, one single layer of the paper layer 21 of the spacer portion, and another single layer of the nonwoven fabric base layer 22 of the spacer portion, but the laminate structure of the spacer portion 2 is not limited to three layers.

At the joints 3 joining the partition 1 and the spacer portion 2, a method using an adhesive or a thermal bonding method not using an adhesive is employed as a method of joining the partition 1 and the spacer portion 2.

In the case of the nonwoven fabric base layer 22 of the spacer portion having a softening temperature of 130° C. or higher and made of a nonwoven fabric containing cellulose as a main component, for example, it is preferable to use an adhesive for joining the partition 1 and the spacer portion 2 in terms of the mechanical strength of the total heat exchange element 10. When an adhesive is used for joining the partition 1 and the spacer portion 2, the nonwoven fabric base layer 22 of the spacer portion exposed on the surface of the spacer portion 2 has a large surface area to be joined to the adhesive, so that the adhesive strength between the spacer portion 2 and the partition 1 can be ensured.

When an adhesive is used for the joints 3, the main component of the adhesive is preferably a resin material such as a vinyl acetate series, urethane series, or polyester series, or a mixture mainly containing a composition thereof in terms of more strongly bonding the partition 1 and the spacer portion 2 together.

Moreover, when an adhesive is used for the joints 3, the nonwoven fabric base layer 22 of the spacer portion and the partition 1 are preferably joined by an aquatic adhesive layer including an aquatic adhesive. The use of the aquatic adhesive allows water to easily permeate through the partition 1, which is a hydrophilic material, and the capillaries in the nonwoven fabric base layer 22 of the spacer portion, whereby penetration of the adhesive can be facilitated. Moreover, by using, as the aquatic adhesive, a type having reversibly cured and melted states based on moisture evaporation and remoistening, the adhesive can be applied to the partition 1 or the spacer portion 2 in advance and its adhesion is made while letting the adhesive get wet at the time of assembly, thereby making necessary work easier.

The adhesive preferably contains a hygroscopic agent in terms of further improving the moisture permeability between the partition 1 and the spacer portion 2. In this case, a deliquescent salt is preferably used as the hygroscopic agent in order to achieve high moisture permeability between the supply air and the exhaust air. As the deliquescent salt, at least one of lithium chloride and calcium chloride is preferably used.

When an adhesive is used for the joints 3, a flame retardant may be added to the adhesive in order to ensure flame retardancy of the total heat exchange element 10. In the first embodiment, examples of the material of the flame retardant added to the adhesive include a bromine-based flame retardant, a phosphorus-based flame retardant, an inorganic flame retardant such as a metal hydroxide or a metallic oxide, or a silicone-based flame retardant.

In the case of the nonwoven fabric base layer 22 of the spacer portion having a softening temperature lower than 130° C., when the layer 22 is made of a nonwoven fabric containing, as a main component, polyurethane having a lower softening temperature than cellulose, for example, the partition 1 and the spacer portion 2 can be joined by thermal bonding to achieve a certain joint with excellent water resistance.

However, use of an adhesive regardless of the softening temperature of the nonwoven fabric base layer 22 of the spacer portion allows a single-sided corrugated portion, a cross-ply layer stack in which single-sided corrugated portions are stacked on top of another, and the total heat exchange element 10 to maintain their mechanical strengths at a level suitable for practical use.

When thermal bonding is performed to join the partition 1 and the spacer portion 2 at the joints 3, the spacer portion 2 is heated at a temperature roughly equal to the softening temperature of the nonwoven fabric base layer 22 of the spacer portion, and the partition 1 and the spacer portion 2 are pressurized to be joined. The thermal bonding method needs to pressurize the joints 3, and thus is preferably performed in a single-sided corrugation step where pressurization is performed easily.

Next, a method of manufacturing the total heat exchange element 10 according to the first embodiment will be described. Typically, in order to achieve efficient manufacturing of a total heat exchange element, there has been widely used a manufacturing method in which single-sided corrugated portions are made and then cross-ply stacked on top of another. The single-sided corrugated portions are each made by joining one piece of the partition 1 and one piece of the spacer portion 2 that is formed in a wave shape. A method of manufacturing the single-sided corrugated portion corresponds to a process of making a typical cardboard. The single-sided corrugated portion is formed by forming the spacer portion 2 by shaping a layer stack of the paper layer 21 of the spacer portion and the nonwoven fabric base layer of the spacer portion 22 into a corrugated shape, and joining the spacer portion 2 and the partition 1.

In a cross-ply layer stack of the single-sided corrugated portions, peaks of the spacer portion 2 corrugated in a first single-sided corrugated portion of the single-sided corrugated portions to be cross-ply layered are joined to a surface of the partition 1, to which the spacer portion 2 is not joined, of a second single-sided corrugated portion of the single-sided corrugated portions to be cross-ply layered. The first single-sided corrugated portion and the second single-sided corrugated portion are cross-ply layered with their respective partitions 1 being parallel to each other. Here, the first single-sided corrugated portion and the second single-sided corrugated portion are joined in a state in which air passages in one of the spacer portions 2 adjacent to each other in the stacking direction and air passages in another one of the spacer portions 2 adjacent to each other in the stacking direction are orthogonal to each other in a direction parallel to the plane of the partition 1 of the first single-sided corrugated portion. In other words, the longitudinal direction of the space formed by the spacer portion 2 and the partition 1 of the first single-sided corrugated portion and the longitudinal direction of the space formed by the spacer portion 2 and the partition 1 of the second single-sided corrugated portion are orthogonal to each other in the direction parallel to the plane of the partition 1 of the first single-sided corrugated portion.

The total heat exchange element 10 is made by repeating the above process and cutting the processed result to a predetermined size. The partition 1 and the spacer portion 2 are joined by a method using an adhesive or a thermal bonding method not using an adhesive. In the case of the nonwoven fabric base layer 22 of the spacer portion having a softening temperature equal to or higher than 130° C., when the layer 22 is made of a nonwoven fabric containing cellulose as a main component, for example, it is preferable to use an adhesive for joining the partition 1 and the spacer portion 2 in terms of the mechanical strength of the total heat exchange element 10. In the case of the nonwoven fabric base layer 22 of the spacer portion having a softening temperature lower than 130° C., when the layer 22 is made of a nonwoven fabric containing, as a main component, polyurethane having a lower softening temperature than cellulose, for example, the partition 1 and the spacer portion 2 can be joined by thermal bonding to achieve a joint with excellent water resistance. However, the use of an adhesive regardless of the softening temperature of the nonwoven fabric base layer 22 of the spacer portion allows a single-sided corrugated portion, a cross-ply layer stack in which single-sided corrugated portions are stacked on top of another, and the total heat exchange element 10 to maintain their mechanical strengths at a level suitable for practical use.

As described above, the total heat exchange element 10 according to the first embodiment has the spacer portion 2 including the nonwoven fabric base layers 22 of the spacer portion that are provided on both the front and back surfaces of the paper layer 21 of the spacer portion to be used as a spacer portion, and that are configured to facilitate the movement of moisture in the plane of the spacer portion 2 by capillary action. As a result, the transfer of moisture from the spacer portion 2 to the partitions 1 via the joints 3 can be efficiently performed in the nonwoven fabric base layers 22 of the spacer portion, thereby improving the humidity exchange performance between the first air flows 6 flowing through the first air passages 4 and the second air flows 7 flowing through the second air passages 5.

The total heat exchange element 10 can thus improve the total heat exchange performance without using a large amount of the hygroscopic agent that may cause the generation of dew condensation water, for the total heat exchange element 10.

As for equipment installed in a building, downsizing of equipment is preferred in order to effectively utilize the space in the building built on a limited land area. In terms of the function of the total heat exchanger, the total heat exchange efficiency can be improved by increasing the size of the total heat exchange element with respect to an air volume to be processed. Therefore, under the environment where downsizing of equipment is preferred, it is required to improve the total heat exchange efficiency while keeping the size of a product controlled. According to the total heat exchange element 10, the humidity exchange performance and thus the total heat exchange efficiency are improved while the overall size of the total heat exchange element 10 is kept minimized.

Therefore, the total heat exchange element 10 according to the first embodiment has an effect of being able to provide an advantageous total heat exchange element that can be used even under a high humidity environment and can improve the humidity exchange efficiency.

Second Embodiment

Figure 11:
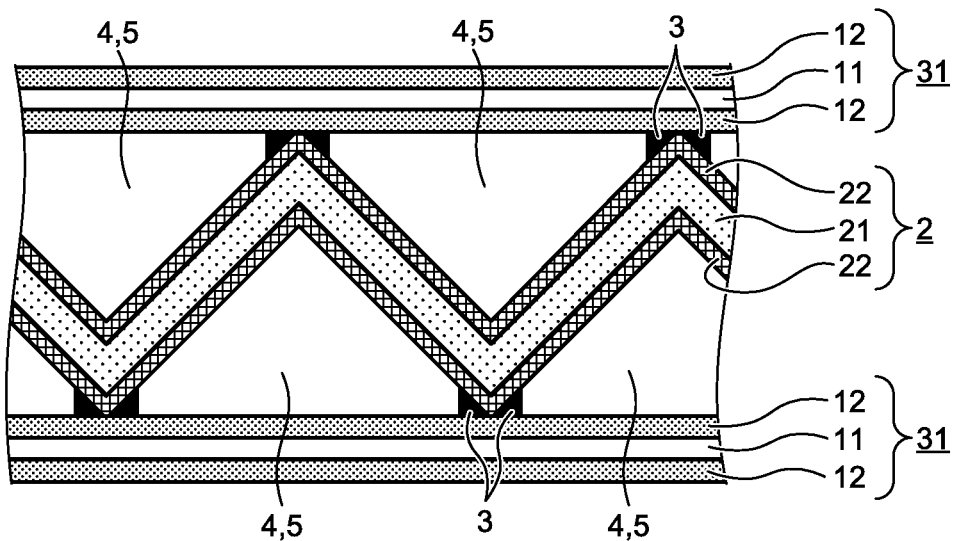
FIG. 11 is a vertical sectional view illustrating a spacer portion and partitions disposed sandwiching the spacer portion, which are extracted from a total heat exchange element according to a second embodiment of the present invention.

FIG. 11 is a vertical sectional view illustrating the spacer portion 2 and partitions 31 sandwiching the spacer portion 2 that are extracted from a total heat exchange element according to a second embodiment of the present invention. The total heat exchange element according to the second embodiment is different from the total heat exchange element 10 according to the first embodiment described above in that the partitions 31 are provided instead of the partitions 1. The configurations other than the partitions 31 of the total heat exchange element according to the second embodiment are the same as those of the total heat exchange element 10 according to the first embodiment described above, and thus will not be described in detail.

The partition 31 has a multilayer structure including a paper layer 11 of the partition made of paper material, and nonwoven fabric base layers 12 of the partition using a nonwoven fabric as a base material. That is, the partition 31 has a laminate structure in which the nonwoven fabric base layer 12 of the partition, the paper layer 11 of the partition, and the nonwoven fabric base layer 12 of the partition are stacked on top of another in this order so that the nonwoven fabric base layers 12 of the partition are laminated on both surfaces of the paper layer 11 of the partition. Therefore, the partition 31 has the structure in which the nonwoven fabric base layers 12 of the partition are exposed on both front and back sides thereof.

The nonwoven fabric base layer 12 of the partition is a fabric made by entangling fibers without weaving fibers and, in terms of the strength and cost of the fabric, the fiber material is preferably cellulose fibers, polyurethane fibers, polyester fibers, or polypropylene fibers, and any mixture of them. The cellulose fibers or polyurethane fibers are more preferable because they are hydrophilic materials and are expected to improve the diffusion of water molecules using capillaries inside the fibers.

The basis weight of the nonwoven fabric base layer 12 of the partition is 5 $g/m^2$ or more and 100 $g/m^2$ or less, preferably 10 $g/m^2$ or more and 30 $g/m^2$ or less in terms of ensuring necessary strength suitable for practical use as the partition 31 and allowing heat exchange to be performed more smoothly for temperature and humidity. Moreover, the thickness of the nonwoven fabric of the nonwoven fabric base layer 12 of the partition is 2 μm or more and 500 μm or less, preferably 5 μm or more and 200 μm or less, more preferably 10 μm or more and 150 μm or less in terms of ensuring necessary strength suitable for practical use as the partition 31 and allowing heat exchange to be performed more smoothly for temperature and humidity. The air permeability of the nonwoven fabric of the nonwoven fabric base layer 12 of the partition is preferably 1 second or less which is the measurement limit or less. However, since a certain gas barrier property is necessary for the partition 31, it is preferable that the air permeance of the partition 31 is 100 seconds/100 cc or more, preferably 1000 seconds/100 cc or more, more preferably 5000 seconds/100 cc or more.

The partition 31 is preferably made of specially treated paper that is made as thin as possible in order to achieve a moisture permeability having a practical level required in practical use, and preferably has the thickness in the range of 5 μm or more and 100 μm or less, preferably 8 μm or more and 70 μm or less, more preferably 10 μm or more and 50 μm or less.

The partition 31 is preferably made of specially treated paper that is made by special processing of adding a hygroscopic agent in order to improve the moisture permeability, and other special processing. The hygroscopic agent to be contained in the partition 31 in order to improve the moisture permeability is preferably made of a deliquescent salt particularly in order to improve the moisture permeability of the partition 31. As the deliquescent salt, at least one of lithium chloride and calcium chloride is used. The amount of lithium chloride or calcium chloride added to the partition 31 is in the range of 2 g/m$^2$ or more and 10 g/m$^2$ or less, preferably 3 g/m$^2$ or more and 6 g/m$^2$ or less. Note that when both lithium chloride and calcium chloride are used as the hygroscopic agent, the amount of lithium chloride and calcium chloride added to the partition 31 is in the range described above in total.

The partition 31 has a laminate structure in which the nonwoven fabric base layers 12 of the partition are laminated on both surfaces of the paper layer 11 of the partition. The nonwoven fabric base layers 12 of the partition diffuse moisture in the plane of the partition 31, the moisture including moisture that has moved from the first air flows 6 flowing through the first air passages 4 or the second air flows 7 flowing through the second air passages 5 to the partition 31 through the joints 3, and moisture that has moved from the spacer portion 2 to the partition 31 through the joints 3. That is, the nonwoven fabric base layers 12 of the partition diffuse the moisture, which has moved to the partition 31 through the joints 3, in the plane of the nonwoven fabric base layers 12 of the partition by capillary action in minute gaps within the nonwoven fabric base layers 12 of the partition. As a result, the total heat exchange element according to the second embodiment can have an effect of further enhancing the effect of the spacer portion 2 as the humidity transfer fin.

Then, the moisture that has moved to the partition 31 through the joints 3 is diffused in the plane of one of the nonwoven fabric base layers 12 of one partition of the partitions 31, which is joined to the joints 3, by capillary action of the one nonwoven fabric base layer 12. The moisture diffused in the plane of the nonwoven fabric base layer 12 of the partition is transferred to the paper layer 11 of the partition, and further transferred to the other one of the nonwoven fabric base layers 12 of the partition of the partition 31.

The total heat exchange element according to the second embodiment described above has the same effect as the total heat exchange element 10 according to the first embodiment described above.

Moreover, the total heat exchange element according to the second embodiment described above has a partition 31 in which the paper layer 11 of the partition and the nonwoven fabric base layers 12 of the partition are laminated, whereby the humidity transfer fin effect in the spacer portion 2 is further improved, and the humidity exchange performance of the total heat exchange element 10 is further improved.

Third Embodiment

Figure 12:
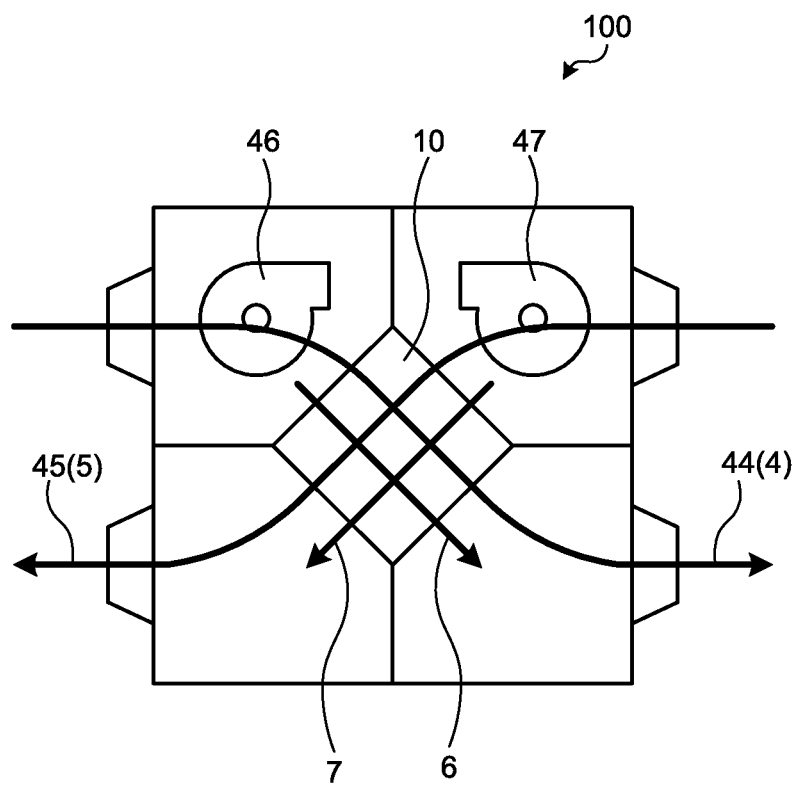
FIG. 12 is a view illustrating a schematic configuration of a total heat exchanger according to a third embodiment of the present invention.

Next, a total heat exchanger 100 including the total heat exchange element 10 according to the first embodiment set forth above will be described with reference to FIG. 12. FIG. 12 is a view illustrating a schematic configuration of the total heat exchanger 100 according to a third embodiment of the present invention. The total heat exchanger 100 houses the total heat exchange element 10 according to the first embodiment described above. Inside the total heat exchanger 100, a supply air passage 44 for supplying outdoor air into a room is formed including the first air passages 4 of the total heat exchange element 10. Also inside the total heat exchanger 100, an exhaust air passage 45 for exhausting indoor air to the outside of the room is formed including the second air passages 5 of the total heat exchange element 10. The supply air passage 44 is provided with a supply blower 46 that generates a flow of air from the outside of the room into the room. The exhaust air passage 45 is provided with an exhaust blower 47 that generates a flow of air from the inside of the room to the outside of the room.

Thus, the total heat exchanger 100 includes the total heat exchange element 10, the supply blower 46 that generates flow of an air current from the outside of a room to the inside of the room in the first passage that is one of the passages sandwiching the partition 1, and the exhaust blower 47 that generates flow of an air current from the inside of the room to the outside of the room in the second passage that is another one of the passages sandwiching the partition 1.

When the total heat exchanger 100 is operated, the supply blower 46 and the exhaust blower 47 operate. As a result, for example, cold and dry outdoor air is allowed to pass through the first air passages 4 as the first air flows 6 that are the supply air flow, and warm and humid indoor air is allowed to pass through the second air passages 5 as the second air flows 7 that are the exhaust air flow.

Inside the total heat exchange element 10, two kinds of air flows, that is, the supply air flow and the exhaust air flow, flow while being separated by the partitions 1. At this time, heat is transmitted between the supply air flow and the exhaust air flow through the partitions 1, and water vapor is transmitted through the partitions 1, so that heat exchange is performed for sensible heat and latent heat between the supply air flow and the exhaust flow. As a result, the supply air flow is heated and humidified to be supplied into the room, and the exhaust air flow is cooled and dehumidified to be exhausted to the outside of the room. Therefore, by using the total heat exchanger 100 to perform ventilation, it is possible to exchange the air between the outside and the inside of the room for ventilation while minimizing the loss of heating and cooling efficiency of indoor air conditioning.

The total heat exchanger 100 according to the third embodiment described above improves the humidity transfer fin effect in the spacer portion 2 of the total heat exchange element 10 and improves the humidity exchange performance of the total heat exchange element 10, thereby making it possible to realize a total heat exchanger with improved humidity exchange performance.

Moreover, by constructing a total heat exchanger equipped with the total heat exchange element according to the second embodiment described above, it is possible to realize further improved humidity exchange performance.

The configurations illustrated in the above embodiments merely represent examples of the content of the present invention, and can be combined together or combined with other publicly known techniques and partially omitted and/or modified without departing from the scope of the present invention.

Reference Signs List 1, 31 partition; 1A first partition; 1B second partition; 2, 2a, 2b, 2c spacer portion; 3 joint; 4, 4A, 4B first air passage; 5, 5A, 5B second air passage; 6 first air flow; 7 second air flow; 10 total heat exchange element; 11 paper layer of the partition; 12 nonwoven fabric base layer of the partition; 21 paper layer of the spacer portion; 22, 22a, 22b, 22c nonwoven fabric base layer of the spacer portion; 44 supply air passage; 45 exhaust air passage; 46 supply blower; 47 exhaust blower; 100 total heat exchanger; 221 first nonwoven fabric base layer; 222 second nonwoven fabric base layer; S partition area; $S_{total}$ total heat transfer area; $S_x$ total moisture permeable area.

The invention claimed is:

1. A total heat exchange element comprising:
at least two spacer portions, each spacer portion including air flow passages; and
a plurality of partitions disposed in a state of being opposed to each other,
each of the at least two spacer portions keeping a respective space between the partitions so that air flow passages between the partitions of one of the at least two spacer portions cross air flow passages between the partitions of an adjacent spacer portion of the at least two spacer portions, wherein
each spacer portion has a laminate structure in which nonwoven fabric base layers using a nonwoven fabric as a base material are layered on both sides of a paper layer,
a first nonwoven fabric base layer that is the nonwoven fabric base layer of the spacer portion layered on one side of the paper layer is joined to the partition opposed to the first nonwoven fabric base layer, and
a second nonwoven fabric base layer that is the nonwoven fabric base layer of the spacer portion layered on another side of the paper layer is joined to the partition opposed to the second nonwoven fabric base layer.

2. The total heat exchange element according to claim 1, wherein
the nonwoven fabric base layer of the spacer portion contains at least one of cellulose fibers and polyurethane fibers.

3. The total heat exchange element according to claim 1, wherein
the nonwoven fabric base layer of the spacer portion is joined to the partition by an aquatic adhesive layer.

4. The total heat exchange element according to claim 1, wherein
the partition has a laminate structure of a nonwoven fabric base layer and a paper layer, the nonwoven fabric base layer using a nonwoven fabric as a base material.

5. The total heat exchange element according to claim 4, wherein
the paper layer of the partition contains at least one of lithium chloride and calcium chloride.

6. The total heat exchange element according to claim 1, wherein
the spacer portion has a corrugated shape.

7. A total heat exchanger comprising:
the total heat exchange element according to claim 1; a supply blower to generate flow of an air current to the inside of a room from the outside of the room in a first passage that is one of passages sandwiching the partition; and an exhaust blower to generate flow of an air current to the outside of the room from the inside of the room in a second passage that is another one of the passages sandwiching the partition.

* * * * *